United States Patent [19]

Gaigl et al.

[11] Patent Number: 4,709,134
[45] Date of Patent: Nov. 24, 1987

[54] ANTIFOGGING DEVICE FOR A DISPLAY GLASS OF AN INDICATING INSTRUMENT

[75] Inventors: Dietmar Gaigl, Leonberg; Klaus Amann, Rutesheim, both of Fed. Rep. of Germany

[73] Assignee: Dr. Ing. h.c.F. Porsche Aktiengesellschaft, Stuttgart, Fed. Rep. of Germany

[21] Appl. No.: 794,538

[22] Filed: Nov. 4, 1985

[30] Foreign Application Priority Data

Nov. 2, 1984 [DE] Fed. Rep. of Germany ....... 3439958

[51] Int. Cl.$^4$ .............................................. H05B 3/22
[52] U.S. Cl. .................................. 219/201; 219/202; 219/504
[58] Field of Search ............... 219/200, 201, 202, 203, 219/504, 505, 210, 345, 211, 214, 218, 213; 73/431, 432 AD; 350/588, 582

[56] References Cited

U.S. PATENT DOCUMENTS

| 2,274,396 | 2/1942 | Barry | 73/431 |
|---|---|---|---|
| 2,545,805 | 3/1951 | Callendar | 219/345 |
| 2,625,640 | 1/1953 | Gaiser | 219/213 |
| 2,797,287 | 6/1957 | Prutzman | 219/219 |
| 2,847,970 | 8/1958 | Smith | 116/DIG. 36 |
| 3,263,063 | 7/1966 | Marriott | 219/218 |
| 3,798,419 | 3/1974 | Maake | 219/219 |
| 3,887,788 | 6/1975 | Seibel | 219/548 |
| 3,898,422 | 8/1975 | Fuller | 219/202 |
| 4,035,608 | 7/1977 | Stromquist | 219/213 |
| 4,037,082 | 7/1977 | Tamada | 219/505 |
| 4,060,712 | 11/1977 | Chang | 219/219 |
| 4,127,765 | 11/1978 | Heaney | 219/218 |
| 4,237,366 | 12/1980 | Berg | 219/505 |
| 4,399,347 | 8/1983 | Schmitt | 219/345 |
| 4,527,047 | 7/1985 | Seitz | 219/202 |

FOREIGN PATENT DOCUMENTS

| 1717265 | 2/1956 | Fed. Rep. of Germany . | |
|---|---|---|---|
| 2114830 | 3/1971 | Fed. Rep. of Germany . | |
| 2131919 | 6/1971 | Fed. Rep. of Germany . | |
| 2227902 | 6/1972 | Fed. Rep. of Germany . | |
| 2320021 | 11/1974 | Fed. Rep. of Germany . | |
| 7918076 | 10/1979 | Fed. Rep. of Germany . | |
| 4425512 | 3/1965 | Japan | 219/504 |

Primary Examiner—E. A. Goldberg
Assistant Examiner—Teresa J. Walberg
Attorney, Agent, or Firm—Barnes & Thornburg

[57] ABSTRACT

The display glass of an indicating instrument which is placed in front of a displaying front plate is heated by the absorption of radiating heat which is emitted by the heating of the displaying front plate by PTC electrical resistance elements which are advantageously fastened at the displaying front plate's rear side. By way of this device that is simple and cost-effective in regard to construction, fogging is removed on a display glass of an indicating instrument and a repeated fogging is reliably avoided.

17 Claims, 2 Drawing Figures

ANTIFOGGING DEVICE FOR A DISPLAY GLASS OF AN INDICATING INSTRUMENT

BACKGROUND AND SUMMARY

This invention relates to an antifogging device for a display glass that is placed in front of a displaying front plate of an indicating instrument.

Indicating instruments, as a rule, contain a more or less sealed-off air volume. Moisture that was able to penetrate easily results in a fogging of the display glass covering a displaying front plate on an indicating instrument. This is especially so in cases where the air volume, for example, because of Joule's heat loss of the components of the indicating instrument, is heated to a temperature exceeding the ambient air temperature and thus the temperature of the display glass.

An arrangement for removing fogging on display glasses of instruments is known on the basis of U.S. Pat. No. 2,697,242. In this case, the display glass is pivoted in the instrument housing. When the display glass is turned, it is guided over a wiping device that is stationarily connected with the housing.

This construction has the disadvantage that the removal of the fogging requires a manual operation that diverts the operating person. In addition, no measures are taken to prevent a repeated fogging.

It is also a disadvantage that by means of the wiping device, an unimpaired view of the display is prevented at least in areas.

In addition, it is known to heat instrument housings from the inside, for example, according to German Published Examined Patent Application (DE-AS) 23 20 021 or German Published Unexamined Patent Application (DE-OS) 21 31 919.

It is true that in the case of these known devices it is avoided that moisture that may have entered damages the metering works, especially in the case of temperatures below the freezing point. However, this does not prevent a fogging of the cooler parts of the instrument housing or of the display glass, but, on the contrary, causes it.

It is therefore an objective of the invention to provide an antifogging device for the display glass of an indicating instrument which can be built in a simple and cost-effective manner and by means of which a fogging of the display glass can be removed simply, reliably and automatically and a repeated fogging is prevented.

This objective is achieved according to the invention by an arrangement wherein the display glass is heated by means of the absorption of radiating heat emitted by the displaying front plate, which front plate is heated. In especially preferred embodiments the front plate is made of a heat conducting material and exhibits a high degree of heat emission on its surface facing the display glass. The front plate is preferably heated at its side opposite the display glass. In certain preferred embodiments the front plate is thermostatically heated by electric resistance heating PTC elements.

The advantages of the invention are that a fogging on a display glass of an indicating instrument is automatically removed by means of a device that can be built in a simple and cost-effective way and a repeated fogging is avoided.

Commercially available components can be used by applying so-called PTC-elements (i.e., resistors with a positive temperature coefficient) as an electric resistance heating, such as they are also used for the heating of outside mirrors on vehicles. In addition, because of the heating of the side of the display screen that faces away from the display glass, an adaptation of the indicating instruments is mostly superfluous since as a rule sufficient space is available there anyhow for such components. For this reason, the device is also suitable for retrofitting existing indicating instruments.

Further objects, features, and advantages of the present invention will become more apparent from the following description when taken with the accompanying drawings(s) which show, for purposes of illustration only, an embodiment in accordance with the present invention.

DETAILED DESCRIPTION OF THE DRAWING

Figure 1:
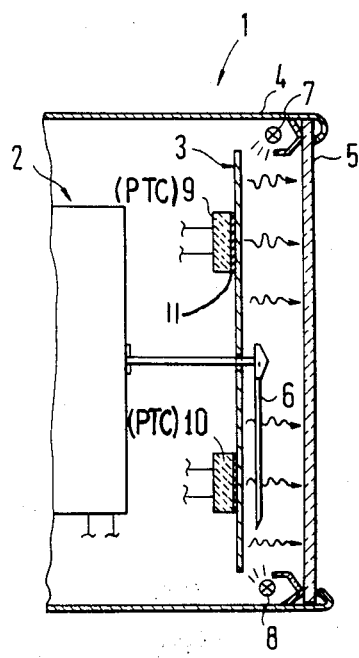
FIG. 1 is a schematic part sectional side view depicting an indicating instrument constructed in accordance with a preferred embodiment of the present invention.

An indicating instrument 1 is shown having a pointer measuring mechanism 2, such as is used in the case of motor vehicles for indicating vehicle speed, a coolant temperature or a fuel level.

The pointer measuring mechanism 2 and a displaying front plate 3 are arranged within a housing 4 which is covered by a display glass 5. Generally, the displaying front plate 3, in an area through which a pointer 6 of the pointer measuring mechanism 2 moves, is equipped with a scale. The display glass 5 is used for an unimpaired viewing of the displaying front plate 3 and protects it and the pointing measuring mechanism 2 from damage and dirt.

The housing 4, on the rear side (that is not shown), as a rule, is at least partially open. The housing openings may be used for the guiding-through of connecting lines or for heat removal. Moisture that has penetrated into the housing 4 is absorbed by the air in the interior of the housing and with this air is heated by waste heat generated during the operation of the indicating instrument by the pointer measuring mechanism 2 and the lighting means 7, 8 for the displaying front plate 3. On its exterior side, the display glass 5 borders on the—especially in the winter—mostly cooler ambient air. The display glass 5 is thus cooler than the air in the interior of the housing and results in a precipitation of the moisture contained in this air on the side of the display glass 5 facing the interior of the housing. When the displaying front plate 3 is heated, its surface emits heat which is at least partially absorbed by the surface of the display glass 5 in the interior of the housing. In this manner, the display glass heats upon the inside so that the moisture evaporates and a repeated fogging is reliably avoided.

Since conventional displaying front plates, as a rule, consist of thermally very conductive materials, such as aluminum, the displaying front plate 3 can be heated from the side that faces away from the display glass 5. Frequently, sufficient space also exists there for the housing of heating elements. It is especially advantageous if the side facing the display glass 5 is darkly anodized or coated with a material that has a high degree of heat emission.

For the heating of the displaying front plate 3, electric resistance heating elements 9, 10 are advantageously used which are connected with plate 3 with an attachment 11 by being glued to it according to certain preferred embodiments. Other embodiments are contemplated where the heating elements are soldered or clamped to the plate 3. A thermostatic control is also provided for limiting the temperature in certain preferred embodiments.

It is especially advantageous to use resistance heating elements 9, 10 made of a material having a positive temperature coefficient of the electric resistor, so-called PTC-elements, such as they are also used for the heating of outside mirrors of vehicles. This has the advantage that existing, commercially available components can be used and a thermostatic control is not required because these elements have the characteristic that they automatically control their own heat.

Figure 2:
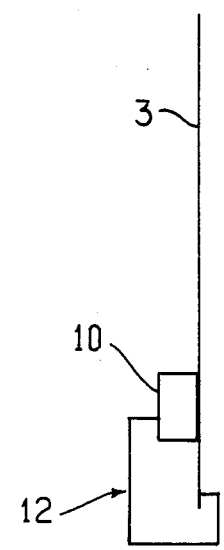
FIG. 2 is a schematic part sectional side view depicting a clamp holding a heating element to a front plate.

For reasons of simplicity an electric diagram is not shown. The resistance heating elements is put into operation in a simple way when the indicating instrument is activated. In preferred embodiments for use in automobiles, when the ignition is switched on, the heating elements 9 and 10 are connected with a power supply unit and when the ignition is switched off they are disconnected from the power supply unit. FIG. 2 schematically shows clamps 12 which clamp the PCT elements 9, 10 to the displaying front plate 3 in certain preferred embodiments.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An antifogging device for a display glass on an indicating instrument of the type having a displaying front plate arranged at a distance behind the display glass, comprising heating means for heating the displaying front plate such that said display glass is heated by absorption of heat radiated by said displaying front plate to limit fogging of the display glass.

2. An antifogging device according to claim 1, wherein the displaying front plate is made of a heat-conducting material.

3. An antifogging device according to claim 1, wherein the displaying front plate is heated on a side that faces away from the display glass.

4. An antifogging device according to claim 1, wherein a surface of the displaying front plate facing the display glass has a high degree of heat emission.

5. An antifogging device according to claim 1, wherein the displaying front plate is thermostatically heated by said heating means.

6. An antifogging device according to claim 1, wherein the heating means includes means for heating at least the side of the display glass facing the displaying front plate to a temperature which is above a temperature of a medium surrounding the display glass on this side.

7. An antifogging device according to claim 1, wherein the heating means includes means for heating the display glass up to a temperature which is above a maximum value of the temperatures of the media surrounding the display glass.

8. An antifogging device according to claim 1, wherein the heating means includes means for activating the heating during operation of the indicating instrument.

9. An antifogging device according to claim 1, wherein the heating means includes electric resistance heating means.

10. An antifogging device according to claim 9, wherein the electric resistance heating means has an electric resistor with a positive temperature coefficient (PTC).

11. An antifogging device according to claim 10, wherein PTC-elements are used as resistance heating means.

12. An antifogging device according to claim 11, wherein the PTC elements are mounted directly on a side of the displaying front plate which is opposite the display glass.

13. An antifogging device according to claim 12, wherein the displaying front plate is thermostatically heated by said heating means.

14. An antifogging device according to claim 13, wherein the side of the displaying front plate facing the display glass is darkly anodized or coated to increase its heat emissivity.

15. An antifogging device according to claim 14, wherein said PTC elements are glued to the displaying front plate.

16. An antifogging device according to claim 14, wherein said PTC elements are soldered to the displaying front plate.

17. An antifogging device according to claim 14, wherein said PTC elements are clamped to the displaying front plate.

* * * * *